United States Patent
Yamasaki

(10) Patent No.: US 7,630,000 B2
(45) Date of Patent: Dec. 8, 2009

(54) ELECTRONIC BLURRING CORRECTION APPARATUS

(75) Inventor: Masafumi Yamasaki, Hachioji (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 546 days.

(21) Appl. No.: 11/481,619

(22) Filed: Jul. 6, 2006

(65) Prior Publication Data

US 2007/0024716 A1 Feb. 1, 2007

(30) Foreign Application Priority Data

Jul. 29, 2005 (JP) ............................. 2005-221761
Feb. 27, 2006 (JP) ............................. 2006-051201

(51) Int. Cl.
*H04N 5/228* (2006.01)

(52) U.S. Cl. .............................. 348/208.6; 348/208.12; 348/304

(58) Field of Classification Search ......... 348/294–324, 348/248, 226.1, 221.1, 230.1; 396/52–56
See application file for complete search history.

(56) References Cited

U.S. PATENT DOCUMENTS

| | | | | |
|---|---|---|---|---|
| 5,144,449 | A * | 9/1992 | Ishida et al. | 348/302 |
| 5,438,364 | A * | 8/1995 | Maeshima et al. | 348/223.1 |
| 5,517,243 | A * | 5/1996 | Kudo et al. | 348/296 |
| 5,764,611 | A * | 6/1998 | Watanabe | 386/113 |
| 5,835,137 | A * | 11/1998 | McKeown | 348/208.4 |
| 6,219,468 | B1 * | 4/2001 | Yukawa et al. | 382/312 |
| 6,441,851 | B1 * | 8/2002 | Yonemoto | 348/294 |
| 6,507,365 | B1 * | 1/2003 | Nakamura et al. | 348/296 |
| 6,515,703 | B1 * | 2/2003 | Suzuki et al. | 348/317 |
| 6,757,015 | B2 * | 6/2004 | Inokuma et al. | 348/273 |
| 6,778,210 | B1 * | 8/2004 | Sugahara et al. | 348/208.4 |
| 6,903,764 | B2 * | 6/2005 | Kusaka | 348/208.6 |
| 7,027,087 | B2 * | 4/2006 | Nozaki et al. | 348/231.99 |
| 7,042,507 | B2 * | 5/2006 | Sato et al. | 348/333.11 |
| 7,340,160 | B2 * | 3/2008 | Kamimura et al. | 396/52 |
| 7,432,953 | B2 * | 10/2008 | Washisu, Koichi | 348/208.5 |
| 2001/0010554 | A1 * | 8/2001 | Yoshida | 348/312 |
| 2004/0095472 | A1 * | 5/2004 | Yoshida et al. | 348/208.12 |
| 2006/0110147 | A1 * | 5/2006 | Tomita et al. | 396/55 |
| 2006/0132623 | A1 * | 6/2006 | Nozaki et al. | 348/231.99 |
| 2006/0216008 | A1 * | 9/2006 | Iwanaga | 396/52 |

FOREIGN PATENT DOCUMENTS

| | | |
|---|---|---|
| JP | 2002-135659 | 5/2002 |
| JP | 2005-198148 | 7/2005 |

* cited by examiner

*Primary Examiner*—Tuan V Ho
*Assistant Examiner*—Don Nguyen
(74) *Attorney, Agent, or Firm*—Straub & Pokotylo; John C. Pokotylo

(57) ABSTRACT

An electronic blurring correction apparatus in the present invention includes a solid-state image-capturing device, which has an image-capturing section with photodiodes and vertical transfer CCD and an accumulation section with a vertical transfer CCD and a horizontal transfer CCD, wherein a first image transferred from the image-capturing section is accumulated in the vertical transfer CCD, relative blurring between the first image and a second image which is already accumulated in the horizontal transfer CCD is corrected by shifting the first image within the vertical transfer CCD and shifting the second image within the horizontal transfer CCD, and thereafter a composite image, which is obtained by combining the first image and the second image, is accumulated as a new second image in the horizontal transfer CCD.

6 Claims, 7 Drawing Sheets

ELECTRONIC BLURRING CORRECTION APPARATUS

This application claims benefit of Japanese Application No. 2005-221761 filed in Japan on Jul. 29, 2005, Japanese Application No. 2006-051201 filed in Japan on Feb. 27, 2006, the contents of which are incorporated by this reference.

BACKGROUND OF THE INVENTION

1. Field of the Invention

The present invention relates to an electronic blurring correction apparatus capable of electronically correcting blurring of images.

2. Description of the Related Art

Among the image-capturing apparatuses for capturing a static image or dynamic image using a solid-state image-capturing device, there are quite a number of image-capturing apparatuses which can be held in hand to perform photography. In such image-capturing apparatuses, when, for example, the brightness of a photographic subject is low, camera shake occurs easily because the shutter speed is slow. Further, in in-car cameras and the like as well, camera shake can occur due to vibration of the vehicle in motion.

Various technologies for correcting such camera shake are proposed in the prior art, among which there are, for example, an optical camera shake correction technology which moves the optical system in accordance with vibration, a sensor shift camera shake correction technology which moves a solid-state image-capturing device in accordance with vibration, and an electronic blurring correction which corrects blurring by processing a captured image.

Among these technologies above, regarding the electronic blurring correction technology, there is one for dynamic images, which holds the position of a photographic subject in an image constant by changing the clipping position of the image for each frame in accordance with a camera shake. However, this technology is not designed for preventing blurring of an image within one frame, and thus cannot be applied in static images.

On the other hand, various electronic blurring corrections apparatuses which can be applied in static images are also proposed.

(1) For example, Japanese Patent Application Laid-Open No. 2002-135659 describes a technology in which a layer of a group of photoelectric conversion elements, Y-direction CCD shift register layer, X-direction CCD shift register layer, and a layer of a group of charge accumulation elements are stacked on a semiconductor by means of the 3-dimensional integrated circuit technology to configure an image sensor, and the phase of the transfer clock of the Y-direction CCD shift register layer and the phase of the transfer clock of the X-direction CCD shift register layer are controlled so that charges can be transferred in both the plus and minus directions.

Suppose that blurring occurs while exposure is performed using the image sensor with the above configuration. Then, charges which are generated on the layer of a group of photoelectric conversion elements are transferred in parallel to the Y-direction CCD shift register first, and then transferred by the Y-direction CCD shift register by the amount corresponding to the Y-direction components of a blurring signal.

Next, the charges which are transferred in the Y-direction are transferred in parallel from the Y-direction CCD shift register layer to the X-direction CCD shift register layer, and then transferred by the X-direction CCD shift register layer by the amount corresponding to the X-direction components of the blurring signal.

Subsequently, the charges which are transferred in the X-direction are transferred from the X-direction CCD shift register layer to the layer of a group of charge accumulation elements and accumulated.

The above-described operation is carried out every time when the blurring signal is changed by the size of the photoelectric conversion element, and the layer of a group of charge accumulation elements is scanned when the exposure is ended, whereby an image signal is output.

In this manner, by changing the shift amount of the CCD shift registers in accordance with the image blurring amount to change the transfer path of the charges, an image signal with no image blurring can be obtained.

(2) Further, Japanese Patent Application Laid-Open No. 2005-198148 describes a technology with respect to a solid-state image-capturing device for generating an image signal corresponding to light from a photographic subject, in which a plurality of photoelectric conversion sections, which are arranged in a biaxial direction, and charges, which are read out from the photoelectric conversion sections, are transferred in any direction of the positive and negative directions of the biaxial direction with respect to the biaxial direction, and charges which are transferred by arbitrary number of pixels are mixed with the charges which are read out from the photoelectric conversion section and correspond to the pixels at the transfer destination.

Accordingly, when displacement occurs between an image based on the charges read out from the photoelectric conversion section to a charge transfer section, and an image based on the charges accumulated thereafter in the photoelectric conversion section, due to camera shake along a transferable direction in the charge transfer section, an image obtained before the camera shake occurrence can be moved so that it matches an image obtained after the camera shake occurrence, so that images with blurring corrected in the biaxial direction can be combined.

However, in the technology described in Japanese Patent Application Laid-Open No. 2002-135659 described above, since the multilayer integrated circuit with the three-dimensional structure is required, it is expected that the production cost of the image-capturing device increases.

Furthermore, the technology described in Japanese Patent Application Laid-Open No. 2005-198148 described above is configured such that the transfer path for moving images in the biaxial direction is formed in the image-capturing section, the pixel aperture ratio of the pixels decreases and whereby the sensitivity decreases. In addition, since the transfer path in the biaxial direction is provided in the image-capturing section, smear increases, compared to a conventional interline transfer CCD having a transfer path in a uniaxial direction.

SUMMARY OF THE INVENTION

An object of the present invention is to provide an electronic blurring correction apparatus capable of obtaining high-quality images in which blurring is corrected, without increasing costs.

In brief, the present invention is an electronic blurring correction apparatus having an image-capturing device in which mutual blurrings among a plurality of images obtained by time-shared photographing are corrected, and an image with blurring corrected can be output, the electronic blurring correction apparatus comprising: an image-capturing section which receives light from a photographic subject and generates an image signal; an accumulation section which accumulates images captured by the image-capturing section; a first transfer register which is provided in the accumulation section and stores a first image captured by the image-capturing section; a second transfer register which is provided in the accumulation section, is disposed to intersect with the first transfer register, and stores a second image captured by the image-capturing section; a blurring detection section which detects relative blurring between the first image and the second image; a transfer control section which performs control so that the first transfer register and the second transfer register respectively transfer the first image and the second image so as to correct the relative blurring between the first image and the second image in accordance with blurring of an image which is detected by the blurring detection section; an image combining section which generates a composite image by combining the first image and the second image which are transferred on the basis of the control performed by the transfer control section; and a control section which controls and causes the image-capturing section, accumulation section, transfer control section, and image combining section to repeatedly execute the operation of combining the first image and the second image.

The above and other objects, features and advantages of the invention will become more clearly understood from the following description referring to the accompanying drawings.

DETAILED DESCRIPTION OF THE PREFERRED EMBODIMENTS

Before explaining the embodiments in detail, first the principle for performing blurring correction is explained briefly.

For example, suppose that optimum exposure time (total exposure time) obtained by performing photometry on a photographic subject is $1/15$ seconds. Also, suppose that blurring occurs at such an exposure time (shutter speed) of $1/15$ seconds. On the other hand, suppose that blurring does not occur or that blurring which may occur can substantively be ignored if the exposure time (shutter speed) is $1/125$ seconds. In such a case, the abovementioned total exposure time of $1/15$ seconds is time-divided by the exposure time of $1/125$ seconds, and time-shared photographing is performed eight times. Eight images which are thus obtained by carrying out this time-shared photographing are combined (added up), whereby a single image is obtained by the optimum exposure time of $1/15$ seconds. However, blurring is not corrected simply by combining the time-shared images taken in $1/125$ seconds, thus blurring of the time-shared images is corrected mutually, and then the images are combined. Then, a region in which all of the time-share images of the combined image overlap with one another is an effective region.

In the embodiments described hereinafter, such blurring correction and combining the time-shared images are carried out within the image-capturing device at high speeds.

The embodiments of the present invention are described hereinafter with reference to the drawings.

Figure 1:
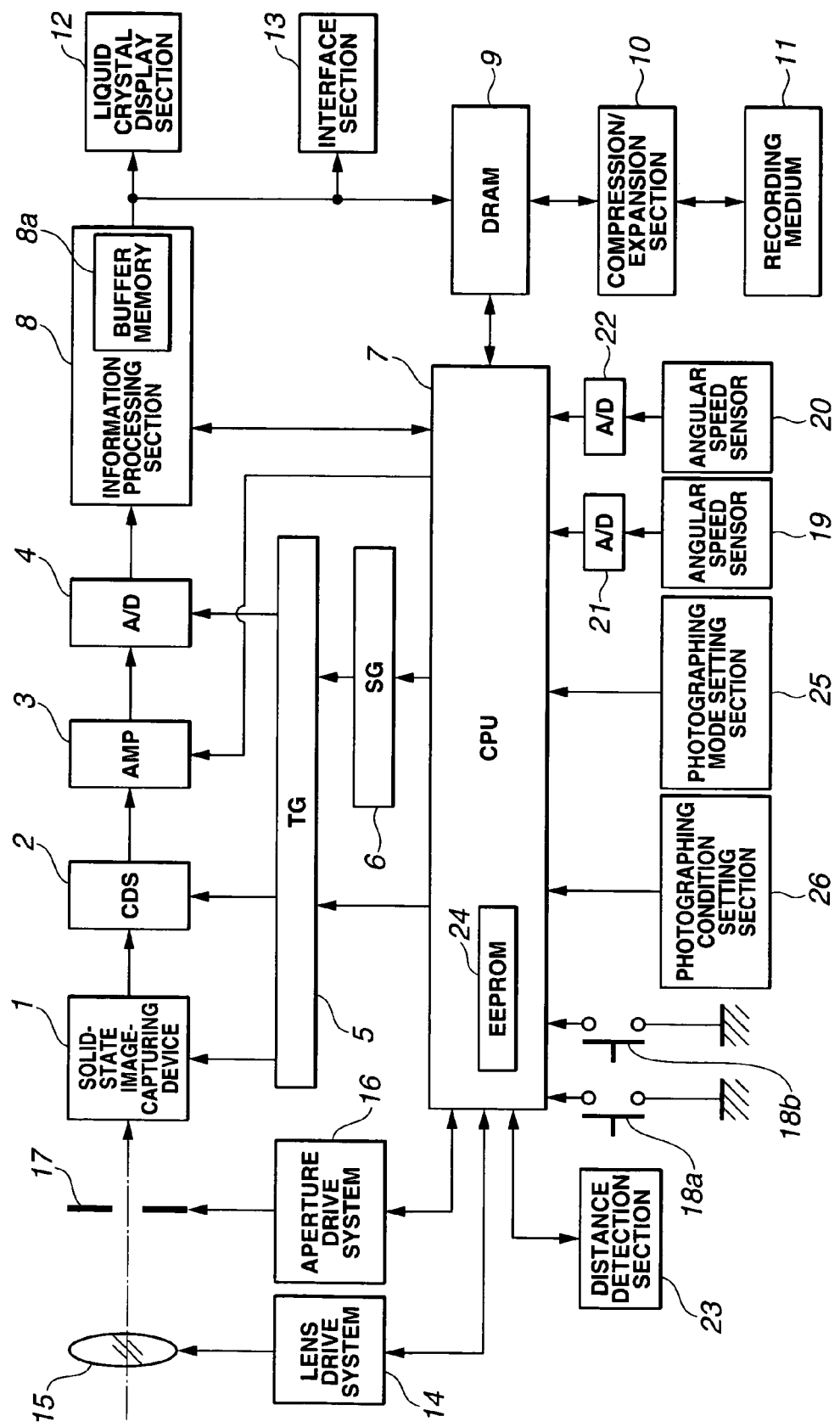
FIG. 1 is a block diagram showing mainly an electrical configuration of a digital camera in an embodiment of the present invention.

FIG. 1 through FIG. 11 show an embodiment, in which FIG. 1 is a block diagram showing mainly an electrical configuration of a digital camera. In the present embodiment an electronic blurring correction apparatus is applied to the digital camera which is an electronic image-capturing apparatus.

This digital camera comprises a solid-state image-capturing device (abbreviated to "image-capturing device" accordingly, hereinafter) 1, a correlated double sampling (CDS) circuit 2, a gain control amplifier (AMP) 3, an A/D converter 4, a timing generator (TG) 5, a signal generator (SG) 6, a CPU 7, an information processing section 8, a DRAM 9, a compression/expansion section 10, a recording medium 11, a liquid crystal display section 12, an interface section 13, a lens drive system 14, a photographing lens 15, an aperture driving system 16, an aperture 17, a first release switch 18a, a second release switch 18b, an angular speed sensor 19, an angular speed sensor 20, an A/D converter 21, an A/D converter 22, a distance detection section 23, an EEPROM 24 incorporated in the CPU 7, a photographing mode setting section 25, and a photographing condition setting section 26.

The photographing lens 15 is an image-capturing optical system for forming an image of a photographic subject on an image-capturing area of the image-capturing device 1.

The aperture 17 is an optical aperture for adjusting the amount of light by regulating a range of passage of an image-forming light beam from the photographing lens 15, and also is a part of an image-capturing optical system.

Figure 2:
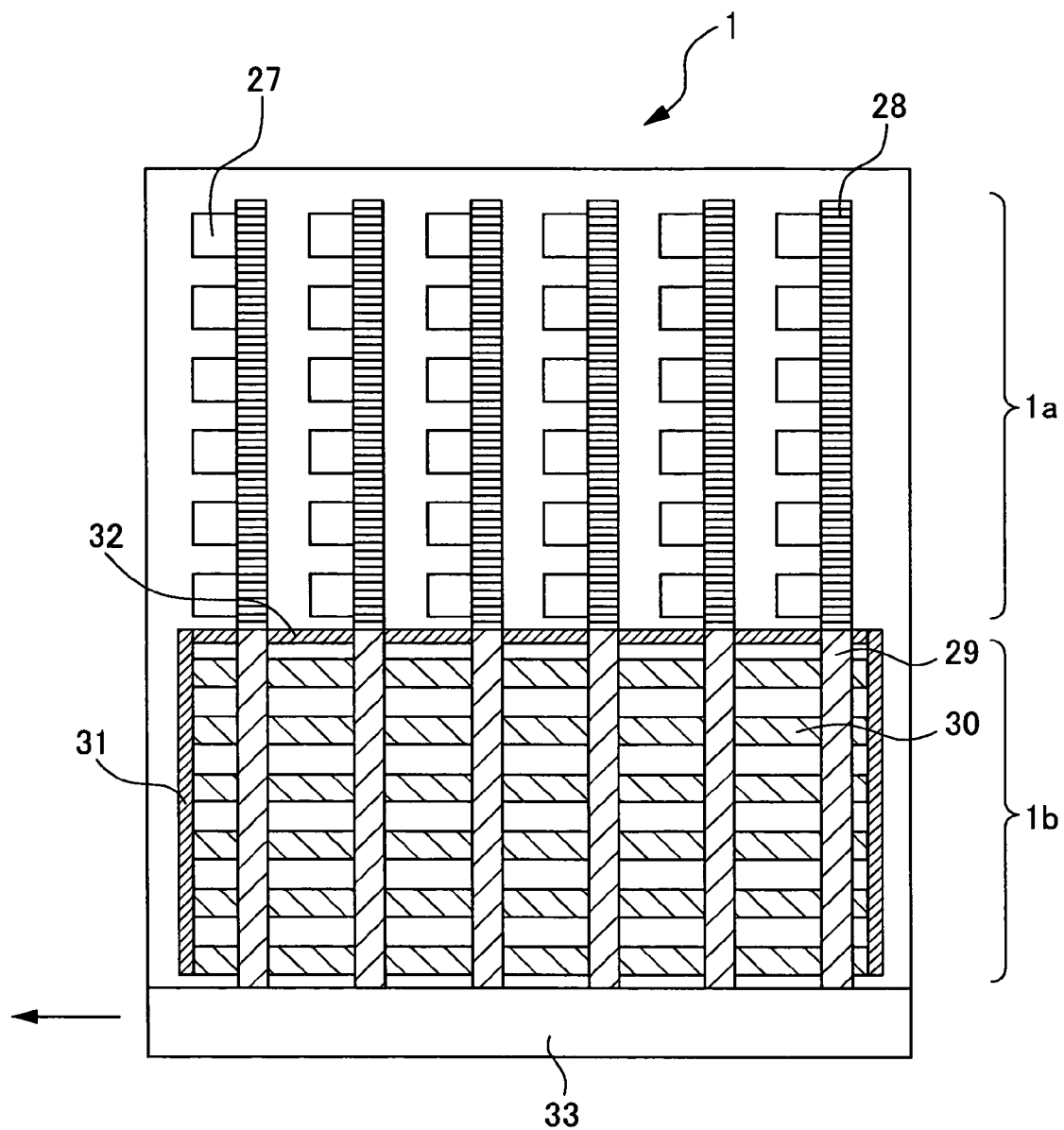
FIG. 2 is a figure showing a configuration example of an image-capturing device in the embodiment.

The image-capturing device 1 photoelectrically converts the image of the photographic subject formed by the photographing lens 15 via the aperture 17, and outputs the converted image as an electric signal. Here, FIG. 2 shows a configuration example of the image-capturing device 1 according to the present embodiment. Detailed configuration or operations of this image-capturing device 1 will be described later.

The TG 5 supplies a transfer pulse for driving the image-capturing device 1 and constitutes a transfer control section.

The CDS 2 is driven in accordance with a sample-and-hold pulse supplied from the TG 5, and eliminates reset noise by performing a correlated double sampling process or other process on an image signal which is output from the image-capturing device 1.

The SG 6 generates a synchronizing signal and outputs it to the TG 5 on the basis of control performed by the CPU 7.

The gain control amplifier (AMP) 3 amplifies an analog signal which is output from the CDS 2. The amplification factor of the gain control amplifier (AMP) 3 is set to an amplification factor corresponding to ISO (International Organization for Standardization) sensitivity Sv, thus the gain control amplifier (AMP) 3 is an ISO sensitivity change section.

The A/D converter 4 is an analog/digital conversion section which converts an analog signal output from the gain control amplifier (AMP) 3 to a digital signal in accordance with a signal supplied from the TG 5.

The information processing section 8 processes a pixel signal which is output from the A/D converter 4, and generates image data. The information processing section 8 comprises an effective-region extraction section having a function of extracting an image data item in which blurring is corrected optimally, from among image data items which are output from the image-capturing device 1. The information processing section 8 further comprises buffer memory 8a for temporarily storing the image data.

The DRAM 9 temporarily stores the image data output from the information processing section 8, and further temporarily stores image data which is obtained by expanding compressed image data by means of the compression/expansion section 10, the compressed image data being read out from the recording medium 11. It should be noted that the buffer memory 8a may be configured to also have the function of the DRAM 9.

The compression/expansion section 10 compresses the image data stored in the DRAM 9 and expands the compressed image data which is read out from the recording medium 11.

The recording medium 11 is a recording section which records the image data compressed by the compression/expansion section 10, and serves as, for example, a nonvolatile recording medium.

The liquid crystal display section 12 displays the image data which is output from the information processing section 8 or the expanded image data which is output from the DRAM 9. The liquid crystal display section 12 combines the function of a display section for performing various warning display and the like.

The interface section 13 is an interface having a terminal for communicating data with external apparatuses such as a monitor and a personal computer. The image data and the like supplied from the information processing section 8 or the DRAM 9 can be output to the external apparatuses via this interface section 13, or, according to the circumstances, the image data and the like can be retrieved into the digital camera from the external apparatuses.

The lens drive system 14 receives a command from the CPU 7 on the basis of a photographic subject distance detected by the distance detection section 23, and thereby drives the photographing lens 15 to a focused position. Such a process is known as so-called auto-focus control. It should be noted here that although auto-focus control is performed on the basis of an output from the distance detection section 23, the CPU 7 may perform focal point detection in the following manner. That is, the CPU 7 extracts a high-frequency component by using a high-pass filter or the like on a brightness component of the image data of one frame (one screen) stored in the DRAM 9, calculate an AF evaluation value corresponding to an outline component or the like of the high-frequency region side by calculating a cumulative composite value of the extracted high-frequency component, and perform focal point detection on the basis of the AF evaluation value.

The aperture drive system 16 is an aperture control section which, after the CPU 7 as a photometry section performs exposure computation on the basis of the image data stored in the DRAM 9, receives a command based on the result from the CPU 7, and thereby drives the aperture 17 to change an opening diameter. Such a process is known as so-called AE (automatic exposure) control.

The angular speed sensor 19 is for detecting angular speed when the digital camera is rotated around an X-axis direction when the X-axis direction is assumed to be the right-side direction in a horizontal direction when viewing the digital camera from the photographic subject side, and serves as a blurring detection section.

On the other hand, the angular speed sensor 20 is for detecting angular speed when the digital camera is rotated around a Y-axis direction when the Y-axis direction is assumed to be an upward direction in a vertical direction of the digital camera, and serves as a blurring detection section.

The A/D converter 21 is to convert an analog signal representing the angular speed detected by the angular speed sensor 19 to a digital signal at a predetermined time interval (sampling interval), and is a part of the blurring detection section.

Similarly, the A/D converter 22 is to convert an analog signal representing the angular speed detected by the angular speed sensor 20 to a digital signal at the predetermined time interval (sampling interval), and is a part of the blurring detection section.

The CPU 7 performs a time integration process on the digital signal obtained by conversion by the A/D converter 21. This time-integrated digital signal is equivalent to the amount of rotation of the camera main body when rotated around the abovementioned X-axis. Moreover, whether the rotation direction around the X-axis is the right-hand direction or left-hand direction is determined by whether the analog output signal of the angular speed sensor 19 is positive or negative.

Similarly, the CPU 7 performs a time integration process on the digital signal obtained by conversion by the A/D converter 22. This time-integrated digital signal is equivalent to the amount of rotation of the camera main body when rotated around the abovementioned Y-axis. Moreover, whether the rotation direction around the Y-axis is the right-hand direction or left-hand direction is determined by whether the analog output signal of the angular speed sensor 20 is positive or negative.

The first release switch 18a is the first stage of the release switch which is constituted of automatic reset type double switch for inputting a command for an image-capturing operation. When the release switch is pressed to turn on the first release switch 18a, a range operation or photometric operation is carried out.

The second release switch 18b is the second stage switch of the release switch which is constituted of the automatic reset type double switches for inputting a command for an image-capturing operation. When the release switch is further pressed to turn on the second release switch 18b, the image-capturing operation is performed by the image-capturing device 1, whereby the image data described above is generated, compressed, and then recorded in the recording medium 11.

The distance detection section 23 is for detecting a distance to the photographic subject, and a known configuration thereof can be employed accordingly.

The photographing mode setting section 25 is for selecting any of a shutter priority photographing mode, an aperture priority photographing mode, and a program photographing mode.

The photographing condition setting section 26 is for setting various photographing conditions such as the shutter speed (exposure time), aperture value, ISO sensitivity and the like.

The CPU 7 incorporates the EEPROM 24 as a nonvolatile memory for storing the relationship between an exposure value Ev and a Tv (exposure time APEX value) and Av (aperture APEX value) for optimally performing exposure control, as a program diagram. This EEPROM 24 can also store other information required in the digital camera accordingly.

A signal from the first release switch 18a, a signal from the second release switch 18b, a signal from the angular speed sensor 19 via the A/D converter 21, a signal from the angular speed sensor 20 via the A/D converter 22, a signal from the photographing mode setting section 25, and a signal from the photographing condition setting section 26 are input to the CPU 7. The CPU 7 then outputs a command to the TG 5 and the SG 6.

Furthermore, the CPU 7 is reciprocally connected to the information processing section 8, the DRAM 9, the lens drive system 14, the aperture drive system 16, and the distance detection section 23, and serves as a control section for controlling the entire digital camera having these components. The CPU 7 combines the functions of the control section, blurring detection section, transfer control section, and exposure time computation section.

Specifically, the CPU 7 performs auto-focus control and AE control as described above, and also performs switching of the drive mode of the image-capturing device 1 on the basis of signals instructing to retrieve static images from the first release switch 18a and the second release switch 18b. Moreover, the CPU 7 further performs control for changing the opening of the aperture 17 or exposure time control of the image-capturing device 1. The CPU 7 then sets the photographing mode of the digital camera on the basis of an input from the photographing mode setting section 25, and sets the photographing condition related to the digital camera, on the basis of an input from the photographing condition setting section 26. In addition, the CPU 7 also performs blurring amount computation and the like on the basis of outputs from the angular speed sensors 19, 20.

FIG. 2 is a figure showing a configuration example of the image-capturing device 1.

As shown in FIG. 2, the image-capturing device 1 is a so-called FIT type CCD (frame interline transfer type CCD) in which the image-capturing section 1a and the accumulation section 1b are separated.

The image-capturing section 1a comprises photodiodes 27 which are the photoelectric conversion sections for photoelectrically converting and thereafter accumulating images, and a vertical transfer CCD 28 which is a first transfer path for transferring, in the vertical direction, charges read out from the photodiodes 27.

The accumulation section 1b comprises a vertical transfer CCD 29 which is a second transfer path for transferring the charges transferred from the vertical transfer CCD 28 of the image-capturing section 1a, to a predetermined position in the accumulation section 1b, a horizontal transfer CCD 30 which is a third transfer path disposed to intersect with the vertical transfer CCD 29, a charge discharging drain 31 which is a charge discharging section for discharging the charges transferred to both ends of the horizontal transfer CCD 30, to the outside of the transfer paths, a charge discharging drain 32 which is a charge discharging section for discharging the charges transferred to an end section on the image-capturing section 1a side of the vertical transfer CCD 29, to the outside of the transfer paths, and a readout horizontal transfer CCD 33 for reading out the charges transferred from the vertical transfer CCD 29, from the image-capturing device 1 to the outside. The accumulation section 1b combines a function of an image combining section as described hereinafter.

In the image-capturing device 1 with such a configuration, pixel charges, which are photoelectrically converted and thereafter accumulated by the photodiodes 27, are transferred to the vertical transfer CCD 29 of the accumulation section 1b via the vertical transfer CCD 28. The charges, which are transferred as a whole to the vertical transfer CCD 29a, form a first image.

First of all, the first image, which is transferred to the vertical transfer CCD 29 by the first time-shared photographing, is thereafter transferred to the horizontal transfer CCD 30. The images accumulated in the horizontal transfer CCD 30 constitute a second image.

An image which is obtained in the next time-shared photographing is transferred to the vertical transfer CCD 29 again. Then, this first image is shifted by a predetermined amount in a direction of canceling relative blurring in the vertical direction between the first image and the second image which is accumulated in the horizontal transfer CCD 30, on the basis of blurring around the X-axis, which is computed on the basis of an output of the angular speed sensor 19. Furthermore, the second image is shifted by a predetermined amount in a direction of canceling relative blurring in the horizontal direction between the second image and the first image which is accumulated in the vertical transfer CCD 29, on the basis of blurring around the Y-axis, which is computed on the basis of an output of the angular speed sensor 20. Then, the first image and the second image, which are shifted so as to cancel the relative blurring on the vertical direction and the horizontal direction, are combined in the intersection of the vertical transfer CCD 29 with the horizontal transfer CCD 30 or in the vicinity thereof (the accumulation section 1b functions as the image combining section), and accumulated in the horizontal transfer CCD 30.

Subsequently, time-shared photographing is carried out again, and a thus obtained image is held as a first image in the vertical transfer CCD 29 of the accumulation section 1b. Similarly, a composite image in which blurring is corrected is generated and held in the horizontal transfer CCD 30. Such an operation is carried out the predetermined number of times, e.g. 10 times, which is set as the number of times time-shared photographing is performed. Here, the charges accumulated in the vertical transfer CCD 29 and the horizontal transfer CCD 30 are shifted upward, downward, or to the right or left in accordance with blurring, thus the charges which have reached the end sections of the horizontal transfer CCD 30, the charges which have reached the end section on the image-capturing section 1a of the vertical transfer CCD 29, and the charges which have reached the end section on the readout horizontal transfer CCD 33 of the vertical transfer CCD 29 are all discharged to the outside of the transfer paths via the charge discharging drain 31, charge discharging drain 32, and the readout horizontal transfer CCD 33 respectively.

Next, the operations of the image-capturing device 1 described above are explained in further detail with reference to FIG. 3 through FIG. 8.

Figure 3:
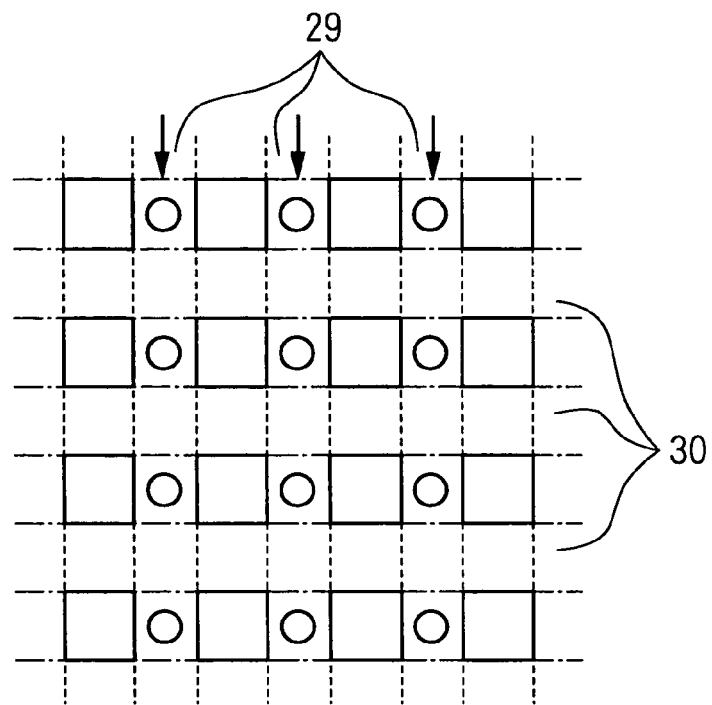
FIG. 3 is a figure showing a state in which a first image, which is obtained with a first time-shared photographing by the image-capturing section, is transferred to a vertical transfer CCD of an accumulation section via a vertical transfer CCD of the image-capturing section, in the embodiment.

First of all, FIG. 3 is a figure showing a state in which the first image, which is obtained in the first time-shared photographing by the image-capturing section 1a, is transferred to the vertical transfer CCD 29 of the accumulation section 1b via the vertical transfer CCD 28. "○" shown in FIG. 3 indicates a charge corresponding to one pixel accumulated in a potential well of the vertical transfer CCD 29.

Figure 4:
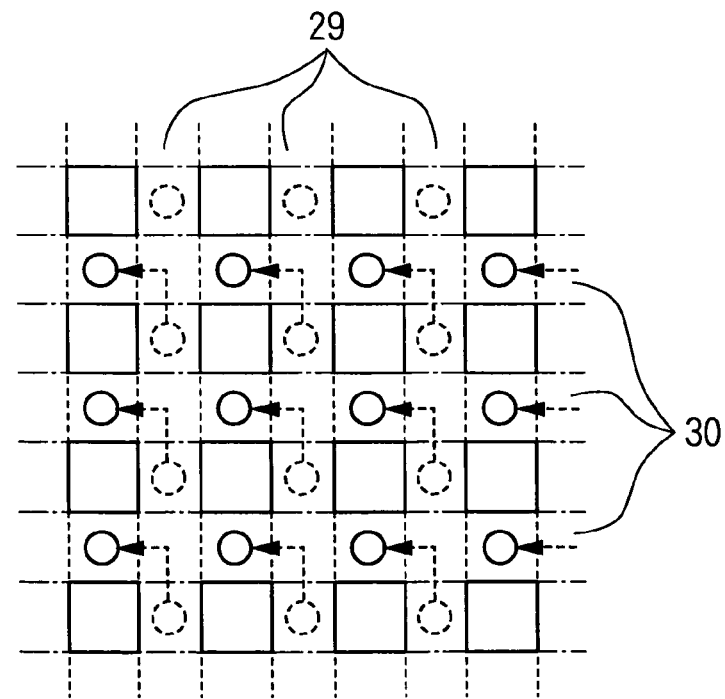
FIG. 4 is a figure showing a state in which the first image of the first time-shared photographing stored in the vertical transfer CCD is transferred to a horizontal transfer CCD and stored as a second image, in the embodiment.

Next, FIG. 4 is a figure showing a state in which the first image of the first time-shared photographing stored in the vertical transfer CCD 29 is transferred to the horizontal transfer CCD 30 and stored as a second image. Sine no images is stored in the horizontal transfer CCD 30 in the first time-shared photographing, the first image stored in the vertical transfer CCD 29 is transferred "as is" to the horizontal transfer CCD 30 and stored as a second image, as shown in FIG. 4.

Figure 5:
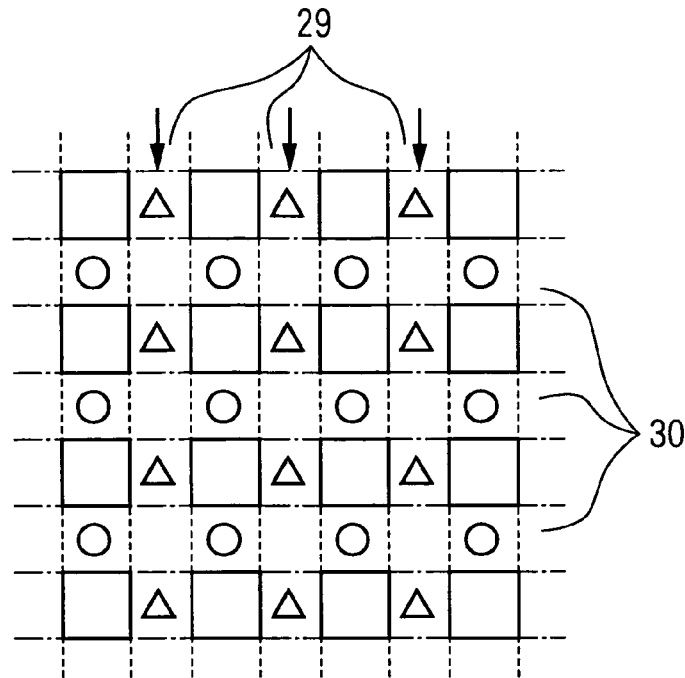
FIG. 5 is a figure showing a state in which the first image, which is obtained with a second time-shared photographing by the image-capturing section, is transferred to the vertical transfer CCD of the accumulation section via the vertical transfer CCD of the image-capturing section, in the embodiment.

FIG. 5 is a figure showing a state in which the first image, which is obtained in the second time-shared photographing by the image-capturing section 1a, is transferred to the vertical transfer CCD 29 of the accumulation section 1b via the vertical transfer CCD 28. "Δ" shown in FIG. 5 indicates a charge of the first image obtained in the second time-shared photographing.

Figure 6:
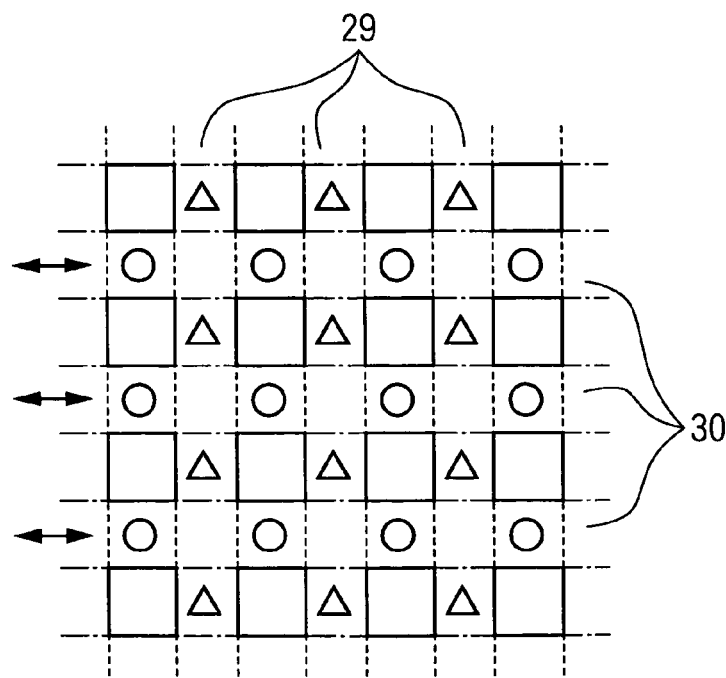
FIG. 6 is a figure showing a state in which the second image stored in the horizontal transfer CCD is shifted in the horizontal direction, in the embodiment.

Further, FIG. 6 is a figure showing a state in which the second image stored in the horizontal transfer CCD 30 is shifted in the horizontal direction. The second image stored in the horizontal transfer CCD 30 is, as shown in FIG. 6, shifted within the horizontal transfer CCD 30 by a predetermined amount in a direction of canceling relative blurring in the horizontal direction between the second image and the first image which is accumulated in the vertical transfer CCD 29, on the basis of blurring around the Y-axis, which is computed on the basis of an output of the angular speed sensor 20.

Figure 7:
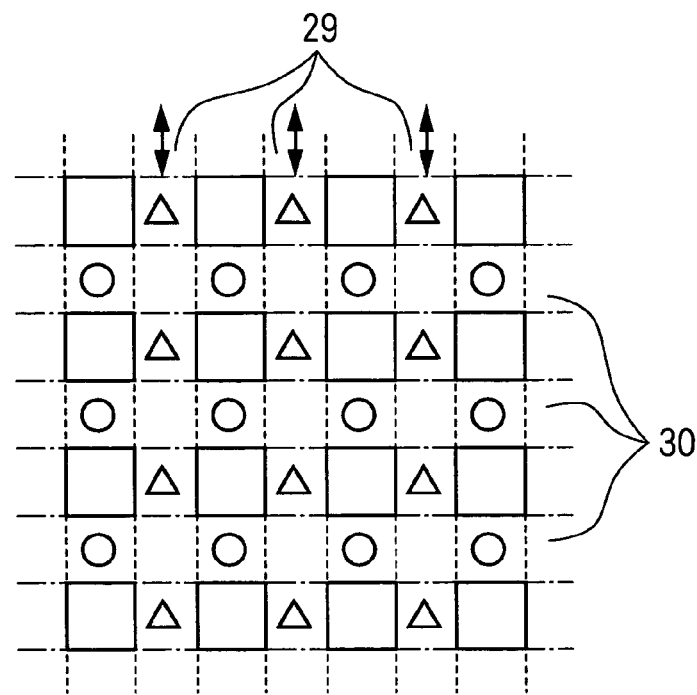
FIG. 7 is a figure showing a state in which the first image stored in the vertical transfer CCD is shifted in the vertical direction, in the embodiment.

FIG. 7 is a figure showing a state in which the first image stored in the vertical transfer CCD 29 is shifted in the vertical direction. The first image stored in the vertical transfer CCD 29 is, as shown in FIG. 7, shifted within the vertical transfer CCD 29 by a predetermined amount in a direction of canceling relative blurring in the vertical direction between the second image and the first image which is accumulated in the horizontal transfer CCD 30, on the basis of blurring around the X-axis, which is computed on the basis of an output of the angular speed sensor 19.

It should be noted that the above has described an example in which blurring in the horizontal direction is corrected first (see FIG. 6) and then blurring in the vertical direction is corrected (see FIG. 7), but an inverse order in which blurring in the vertical direction is corrected first and then blurring in the horizontal direction is corrected may be applied.

Figure 8:
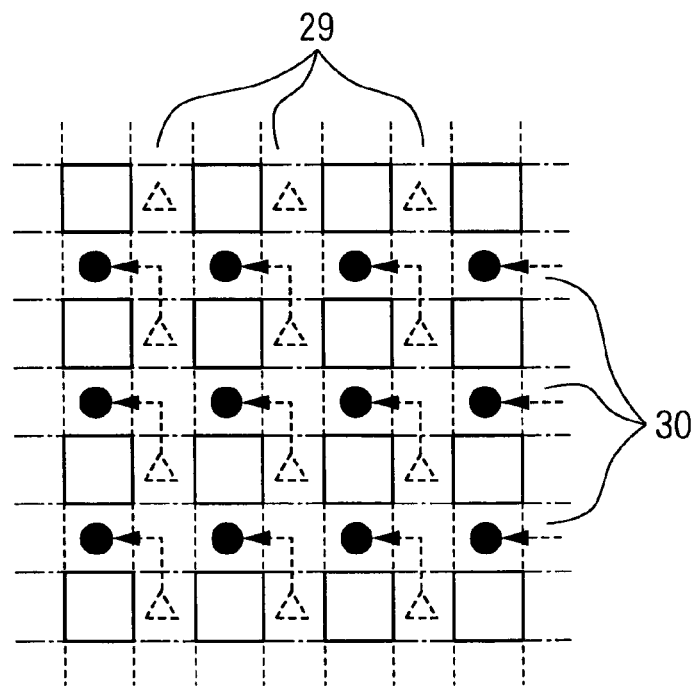
FIG. 8 is a figure showing a state in which the first image stored in the vertical transfer CCD is combined with the second image stored in the horizontal transfer CCD to obtain a composite image as a second image as well, in the embodiment.

Next, FIG. 8 is a figure showing a state in which the first image stored in the vertical transfer CCD 29 is combined with the second image stored in the horizontal transfer CCD 30 to obtain a composite image as a second image as well. The first image (Δ) stored in the vertical transfer CCD 29 is combined, within the horizontal transfer CCD 30, with the second image stored in the horizontal transfer CCD 30 on the nearest upper left ("●" indicates the charges of the composite image). Then, this composite image is stored as a second image again inside the horizontal transfer CCD 30.

It should be noted here that the first image (Δ) stored in the vertical transfer CCD 29 is combined with the second image stored in the horizontal transfer CCD 30 on the nearest upper left, but the position of the horizontal transfer CCD 30 is a selective matter in design since it can be "nearest upper left", "nearest upper right", "nearest lower left" or "nearest upper right" in accordance with the positions of the first image and the second image after correction of the relative blurring.

Further, FIG. 8 shows a state in which the first image and the second image are combined in the horizontal transfer CCD 30, but the first image and the second image may be combined within the vertical transfer CCD 29 by transferring the second image present inside the horizontal transfer CCD 30 to the vertical transfer CCD 29. However, in this case, after combining the first image and the second image, the obtained composite image needs to be transferred to the adjacent horizontal transfer CCD 30 again.

The above operation is repeated until the predetermined number of time-shared photographing is ended. The composite image obtained in this manner eventually becomes an optimum level of image in which blurring is corrected.

Figure 9:
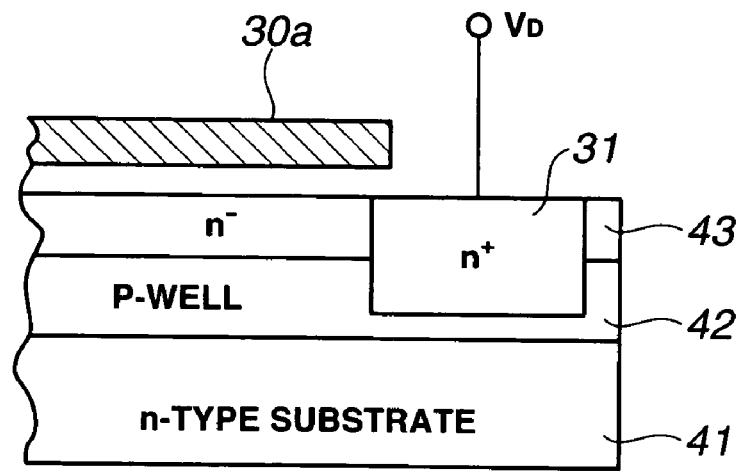
FIG. 9 is a figure showing a configuration example of a charge discharging drain in the embodiment.

It should be noted that, when performing blurring correction, the charges accumulated in the vertical transfer CCD 29 and the horizontal transfer CCD 30 are shifted upward, downward, and to the right and left in accordance with blurring. Therefore, the charges which have reached the both end sections of the horizontal transfer CCD 30 are discharged to the outside of the transfer paths via the charge discharging drain 31. FIG. 9 is a figure showing a configuration example of the charge discharging drain 31.

In the configuration example shown in FIG. 9, on the surface section of an n-type substrate (n-type silicon substrate, for example) 41, first, a p-type diffusion region (p-well) 42 and an n– diffusion region 43 are formed sequentially toward the surface side. Moreover, the drain 31 of an n+ diffusion region is formed adjacent to the potential well (n– diffusion region 43) below a transfer electrode 30a which is the end section of the horizontal transfer CCD 30. The charges which have reached the transfer electrode 30a at the end section are discharged via the drain 31 of the n+ diffusion region.

Figure 10:
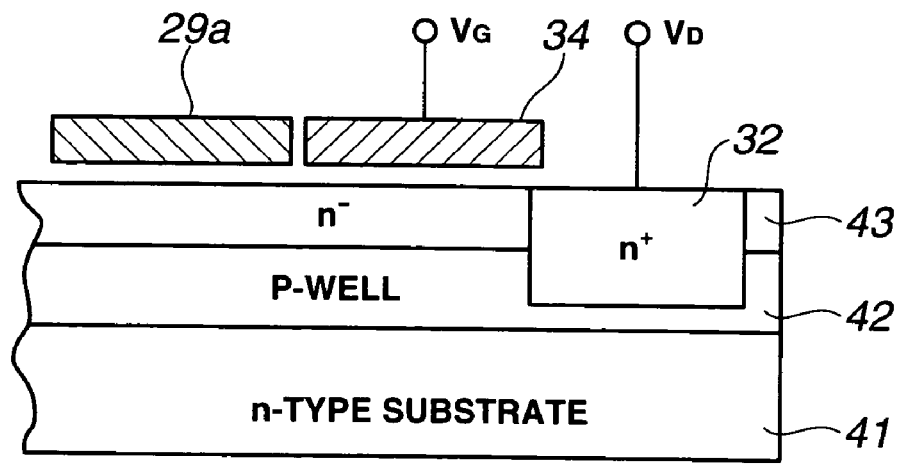
FIG. 10 is a figure showing other configuration example of the charge discharging drain in the embodiment.

On the other hand, if the charges which are transferred to the end section on the image-capturing section 1a side of the vertical transfer CCD 29 are discharged using a drain having the same configuration as the one shown in FIG. 9, charges are no longer transferred from the image-capturing section 1a. Therefore, the charge discharging drain 32 as shown in FIG. 10 is configured at the end section on the image-capturing section 1a side of the vertical transfer CCD 29. FIG. 10 is a figure showing a configuration example of the charge discharging drain 32. Specifically, a gate electrode 34 is provided adjacent to a transfer electrode 29a at the end section on the image-capturing section 1a side of the vertical transfer CCD 29, and the charge discharging drain 32 constituted of the n+ diffusion region is provided across from the transfer electrode 29a, with the gate electrode 34 therebetween. Then, the charges which are transferred to the end section on the image-capturing section 1a side of the vertical transfer CCD 29 are selectively discharged to the charge discharging drain 32 via the gate electrode 34.

Specifically, when charges are transferred from the image-capturing section 1a to the accumulation section 1b, low voltage is applied to the gate electrode 34. Accordingly, the charges which are transferred to the vertical transfer CCD 29 are prevented from being discharged to the charge discharging drain 32. On the other hand, when the charges accumulated in the accumulation section 1b are transferred within the vertical transfer CCD 29 for the purpose of blurring correction, high voltage is applied to the gate electrode 34, whereby the charges transferred to the end section on the image-capturing section 1a side of the vertical transfer CCD 29 are discharged to the charge discharging drain 32. Further, the charges which have been reached to the end section on the readout horizontal transfer CCD 33 of the vertical transfer CCD 29 are discharged via this readout horizontal transfer CCD 33.

According to such configurations and mechanisms, the charges can be prevented from overflowing at the vertical transfer CCD 29 and the horizontal transfer CCD 30.

It should be noted in the above configuration example that when transferring the charges for the purpose of blurring correction, the charges at the end section on the image-capturing section 1a side of the vertical transfer CCD 29 are discharged to the charge discharging drain 32. In stead, however, when transferring the charges for the purpose of blurring correction, the vertical transfer CCD 28 may be driven simultaneously to transfer (discharge) the charges, which have reached an upper end section of the vertical transfer CCD 29, to the vertical transfer CCD 28 so that the charges are prevented from overflowing. In this case, the charges which are discharged to the vertical transfer CCD 28 may be discharged via the vertical transfer CCD 29 (which is not holding charges, in which state the charges are accumulated in the horizontal transfer CCD 30 after the first image and the second image are combined) and the readout horizontal transfer CCD 33 to thereafter carry out the next time-shared photographing.

When the operations of the predetermined number of blurring corrections and combination of the images are ended in the manner described above, the image held in the horizontal transfer CCD 30 is transferred to the vertical transfer CCD 29, and thereafter read out to the outside from the image-capturing device 1 via the vertical transfer CCD 29 and the readout horizontal transfer CCD 33.

Figure 11:
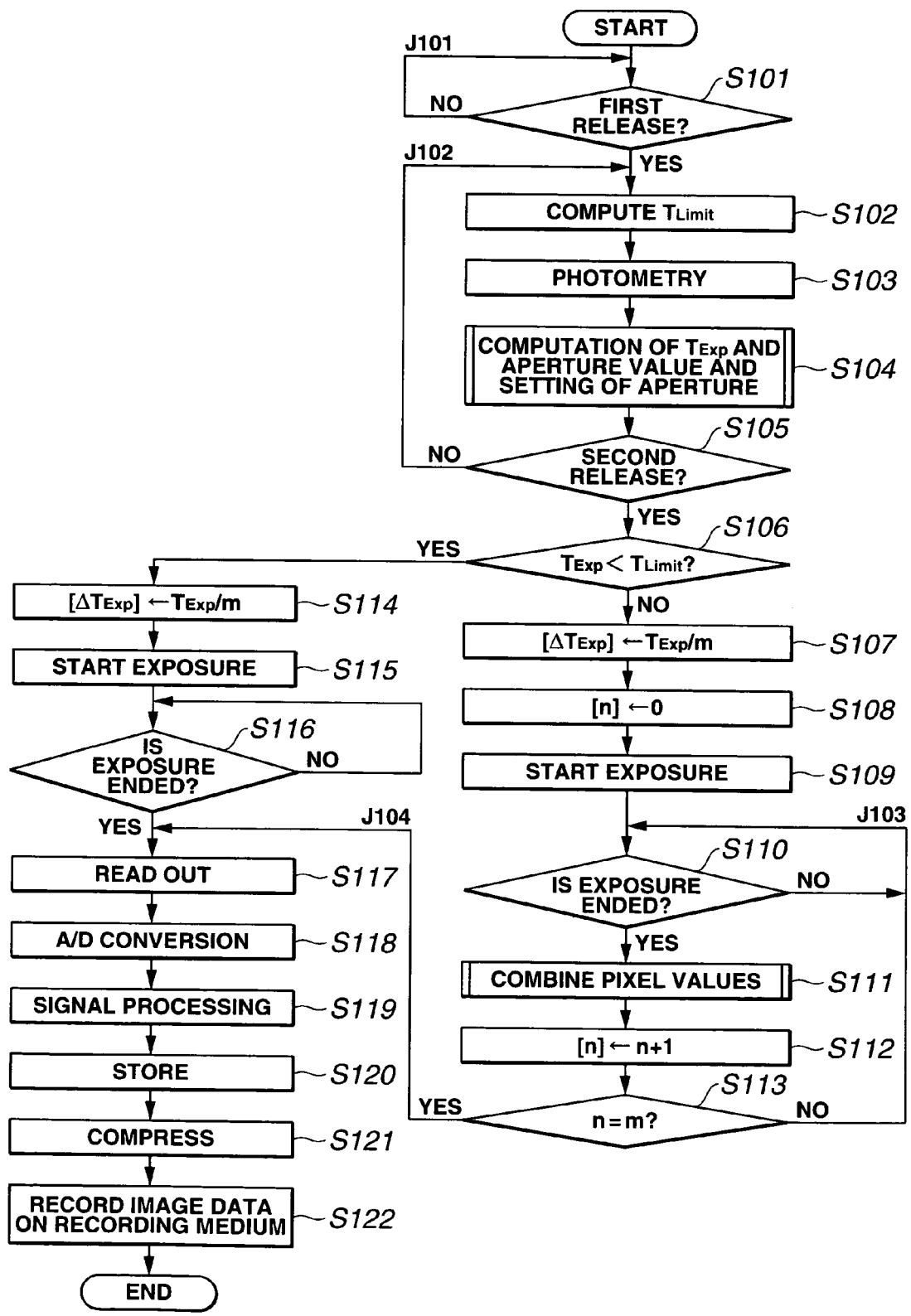
FIG. 11 is a flowchart showing an image capturing and recording processing by means of the digital camera, in the embodiment.

Next, FIG. 11 is a flowchart showing a process performed when capturing an image by means of the digital camera and recording the image.

When the digital camera is powered on (for example, when the battery is replaced), or when an operation start switch (for example, a power switch), which is not shown, is operated, operation of this digital camera is started.

When the process is started, predetermined initial value setting and the like are performed, and thereafter, first of all, it is determined whether or not the first release switch 18a is closed by a release operation of a photographer (step S101).

Here, when the first release switch 18a is not closed, the process is diverted to J101 to similarly repeat detection of the first release switch 18a. However, actually display or other operation of detecting a state of unshown key input is performed between J101 and the step S101, but descriptions of such general operations are omitted accordingly here and hereinafter.

When it is detected in step S101 that the first release switch 18a is closed, blurring limit exposure time TLimit is computed next (step S102). The blurring limit exposure time TLimit is a time at which the blurring amount from starting of exposure supposedly reaches the blurring amount of the tolerance limit.

The blurring limit exposure time TLimit is described here. As the rules of long time experience with a so-called Leica frame (also known as "double frame") camera with the size of 24 mm by 36 mm (43.28 mm diagonal) in 35 mm film cameras, it is known that if the focal distance of the photographing lens in millimeters is f, the blurring limit exposure time TLimit is TLimit≅1/f (seconds). In the present embodiment, this empirical rule is applied in consideration of the size of a photographing frame which is set to be within an effective image-capturing area of the image-capturing device 1 of the digital camera. It should be noted that the blurring limit exposure time TLimit is not necessarily a value obtained based on 1/f, and, in fact, exposure time at which blurring does not practically occur may be used. Therefore, the blurring limit exposure time TLimit may generally be any value as long as it is shorter than the exposure time obtained based on 1/f.

Next, the brightness of the photographic subject is subjected to photometry (step S103). In this photometry, the brightness of the photographic subject is computed by monitoring the level of an image signal which is repeatedly output from the image-capturing device 1. Specifically, the image signals read out from the image-capturing device 1 are processed by the CDS 2, amplified by the gain control amplifier 3, thereafter converted into digital values by the A/D converter 4, and then stored temporarily in the DRAM 9 via the information processing section 8. Out of the image signals stored in the DRAM 9, an image signal in a predetermined region in the vicinity of, for example, the center section of the entire image, is read out by the CPU 7, and an averaging value of the level of the image signal is obtained. The CPU 7 then computes the brightness (Bv) of the photographic subject on the basis of the obtained averaging value.

Subsequently, the CPU 7 computes the shutter speed value (exposure time) TExp required for obtaining optimum exposure and an aperture value of the aperture 17, and sets the aperture of the aperture 17 via the aperture drive system 16 on the basis of a result of the computation (step S104). Here, the exposure time TExp described above is established such that TExp=m×ΔTExp, where ΔTExp is exposure time in time-shared photographing and m is the number of times time-shared photographing is performed.

Next, it is determined whether the second release switch 18b is closed (step S105). Here, if the second release switch 18b is not closed, as long as the first release switch 18a is closed, the process is diverted to J102 to repeatedly perform the processes of the steps S102 through S105 and wait until the second release switch 18b is closed.

In this manner, if it is determined in the step S105 that the second release switch 18b is closed, it is then determined whether the exposure time TExp is shorter than the blurring limit exposure time TLimit (step S106).

If it is determined in the step S106 that TExp<TLimit is not established, next a value, which is obtained by dividing the exposure time TExp by the number of time-shared photographing m, is stored in a memory for storing the exposure time ΔTExp for time-shared photographing (step S107). Here, [ ] means the memory for storing the data shown in the parentheses. Therefore, [ΔTExp] means a memory which stores the variable ΔTExp shown in the parentheses.

Next, an initial value "0" is stored in a memory [n] for storing n, which is the number of times time-shared photographing is actually performed (step S108). Here, for the exposure time ΔTExp for time-shared photographing described above, there are a method of using the abovementioned blurring limit exposure time TLimit, and a method of using exposure time which is obtained by dividing the exposure time TExp computed in the step S103 by a predetermined number m of time-shared photographing. The method of using the blurring limit exposure time TLimit as the exposure time ΔTExp for time-shared photographing is excellent in that it can correct blurring reliably, but the number of times time-shared photographing is performed is increased if the exposure time TExp increases. If the number of time-shared photographing increases, the amount of signals obtained in one time-shared photographing decreases, thus there is a possibility that the S/N (signal to noise ratio) becomes low. Moreover, the amount of saturating signals of the photodiodes needs to be adjusted in accordance with the number of time-shared photographing, whereby the configuration of the image-capturing device becomes complicated. Therefore, the number of types of m which is the number of time-shared photographing is preferably low. In the present embodiment, therefore, there is one type of the number of times m that time-shared photographing is performed. Also, a value which is obtained by dividing the exposure time TExp by m is used as the exposure time for time-shared photographing.

Subsequently, exposure is started (step S109). A substrate application high voltage pulse VSUB for forcibly discharging the charges accumulated in the photodiodes 27 to a semiconductor substrate (substrate=longitudinal overflow drain VOFD) has been repeatedly applied to the image-capturing device 1 since immediately before the start of exposure. The point of time at which the application of this high voltage pulse VSUB is ended and at which the value of the VSUB is set to a value corresponding to the number of times m that time-shared photographing is performed is the point at which exposure is to be started as in the step S109.

Next, it is determined whether one time time-shared photographing is ended (step S110). Here, until it is determined that this one time of the time-shared photographing is ended, the process is diverted to J103 to wait until the time-shared photographing ends.

In this manner, when it is determined in the step S110 that the one time of time-shared photographing is ended, a high voltage transfer pulse is applied to the transfer gate disposed between the diodes 27 of the image-capturing device 1 and the vertical transfer CCD 28, whereby the charges accumulated in the photodiodes 27 are shifted to the vertical transfer CCD 28 of the image-capturing section 1a. The charges which are shifted to the vertical transfer CCD 28 are then transferred to the vertical transfer CCD 29 of the accumulation section 1b.

Then, a process of combining pixel values is performed (step S111). In this pixel value combination, the first image obtained in time-shared photographing and held inside the vertical transfer CCD 29, and the second image held inside the horizontal transfer CCD 30 are shifted within the transfer CCDs 29 and 30 respectively on the basis of the blurring amount in the X-direction and Y-direction, which is computed based on the output signals of the angular speed sensors 19 and 20, as described with reference to FIG. 3 through FIG. 8, whereby blurring is corrected so as to be canceled, and thereafter the process of combining the first and second images are performed. The process of combining pixel values is normally performed at speed higher than the exposure time $\Delta$TExp in time-shared photographing.

Next, n+1 is stored in a memory [n] for storing the number of times n that time-shared photographing is already performed (step S112).

Then, it is determined whether the number of times n that time-shared photographing is already performed is equal to the set number m of time-shared photographing (step S113).

Here, if n=m is not yet reached, the process is diverted to J103, and the process of time-shared photographing and the process of combining pixel values are repeatedly performed as described above.

Further, if it is determined in the step S113 that n=m is established, the process is diverted to J104, the composite image stored in the horizontal transfer CCD 30 is transferred to the vertical transfer CCD 29, and thereafter a readout process of a step S117 described hereinafter is performed.

On the other hand, if it is determined in the step S106 that TExp<TLimit is established, blurring does not practically occur even when time-share photographing is not performed.

Therefore, at this moment, the exposure time $\Delta$TExp is stored in the memory [$\Delta$TExp] (step S114).

Next, exposure is started (step S115), and it is determined whether exposure time has reached the exposure time $\Delta$TExp stored in the memory [$\Delta$TExp]. If it is determined that the exposure time $\Delta$TExp has been reached, the charges generated in the photodiodes 27 are shifted to the vertical transfer CCD 28, whereby exposure is ended (step S116). When this exposure is ended, the charges in the vertical transfer CCD 28 of the image-capturing section 1a are transferred to the vertical transfer CCD 29 of the accumulation section 1b. On the other hand, until the exposure time $\Delta$TExp is reached, the above-described determination is repeated.

In this manner, when the exposure time TExp is shorter than the blurring limit exposure time TLimit, an image with no blurring is output at one photographing as in the conventional photographing method without performing time-shared photographing, thus the processes become simple and unnecessary power consumption which involves blurring correction can be prevented.

If it is determined in the step S116 that exposure is ended, or if it is determined in the step S113 that n=m, the photographed image is read out from the image-capturing device 1 to the outside via the vertical transfer CCD 29 and the readout horizontal transfer CCD 33 (step S117).

The image signals which are read out from the image-capturing device 1 in this manner are processed by the CDS 2, and amplified by the gain control amplifier (AMP) 3, and thereafter converted into digital signals by the A/D converter 4 (step S118).

Subsequently, the image data obtained by digitalizing the image signals are stored in the buffer memory 8a, and thereafter subjected to a predetermined signal process by the information processing section 8 (step S119).

The predetermined signal process performed by the information processing section 8 includes a process of extracting, from the image data which is output from the image-capturing device 1, an image of a region in which blurring correction is considered to have been performed effectively. Specifically, the information processing section 8 also has the function as an effective region extraction section.

Next, the image data which is subjected to the signal process by the information processing section 8 is stored in the DRAM 9 temporarily (step S120).

Thereafter, the image data stored in the DRAM 9 is compressed by the compression/expansion section 10 (step S121), the compressed image data is recorded in the recording medium 11 (step S122), and then this process is ended.

According to such embodiment, a digital camera as an electronic image-capturing apparatus (a digital camera to which the electronic blurring correction apparatus is applied), which has an image-capturing section capable of creating images in which blurring is corrected, can be configured while in succession using, "as is", the characteristics of the image-capturing section of the conventional frame interline transfer system CCD.

Further, the vertical transfer CCD (second transfer path) of the accumulation section combines the function of a transfer path for performing blurring correction, thus it is only necessary that a new horizontal transfer CCD (third transfer path) be provided to the accumulation section in the conventional frame interline transfer CCD for correcting blurring components in the horizontal direction of an image, whereby the configuration can be made comparatively simple.

Furthermore, instead of changing the number of times that time-share photographing is performed, appropriately in accordance with the exposure time, the number of times that time-share photographing is performed is determined beforehand, thus the configuration of the image-capturing device can be made simple.

Moreover, when the exposure time is shorter than the blurring limit exposure time, normal exposure is performed only once without performing time-shared photographing, thus the processes become simple, and unnecessary power consumption which involves blurring correction can be prevented.

In addition, since the charge discharging drain 32 is provided, the charges, which are shifted (transferred) within the vertical transfer CCD (second transfer path) of the accumulation section for the purpose of blurring correction, can be prevented from entering the image-capturing section.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An electronic blurring correction apparatus having an image-capturing device in which mutual blurrings among a plurality of images obtained by time-shared photographing are corrected, and an image with blurring corrected can be output, the electronic blurring correction apparatus comprising:
   an image-capturing section which receives light from a photographic subject and generates an image signal;
   an accumulation section which accumulates images captured by the image-capturing section;
   a first transfer register which is provided in the accumulation section and stores a first image captured by the image-capturing section;
   a second transfer register which is provided in the accumulation section, is disposed to intersect with the first transfer register, and stores a second image captured at a different time from a time the first image was captured by the image-capturing section;
   a blurring detection section which detects relative blurring between the first image and the second image;
   a transfer control section which performs control so that the first transfer register and the second transfer register respectively transfer the first image and the second image so as to correct the relative blurring between the first image and the second image in accordance with blurring of an image which is detected by the blurring detection section;
   an image combining section which generates a composite image by combining the first image and the second image which are transferred on the basis of the control performed by the transfer control section; and
   a control section which controls and causes the image-capturing section, accumulation section, transfer control section, and image combining section to repeatedly execute the operation of combining the first image and the second image.

2. The electronic blurring correction apparatus according to claim 1, wherein the image-capturing device is of a frame interline transfer type, the image-capturing section comprises a photoelectric conversion section and an image transfer section which transfers charges generated in the photoelectric conversion section to the first transfer register provided in the accumulation section, and the second transfer register stores the second image via the first transfer register.

3. The electronic blurring correction apparatus according to claim 1, further comprising an exposure time computation section which computes exposure time for the composite image, wherein the control section performs control so that exposure time for the first image is set to a value obtained by dividing the exposure time for the composite image by a predetermined number of times that time-shared photographing is performed.

4. The electronic blurring correction apparatus according to claim 3, wherein when the exposure time for the composite image is shorter than predetermined blurring limit exposure time which is previously, set so that blurring amount becomes an allowable value, the control section performs control so as to perform only one time image-capturing in the exposure time for the composite image, and to read out a thus obtained image from the image-capturing device via the first transfer register.

5. The electronic blurring correction apparatus according to claim 1, further comprising a charge discharging section for discharging charges, which are transferred to an end section of the first transfer register or the second transfer register of the accumulation section, to the outside.

6. An electronic blurring correction apparatus having an image-capturing device in which mutual blurrings among a plurality of images obtained by time-shared photographing are corrected, and an image with blurring corrected can be output, the electronic blurring correction apparatus comprising:
   an image-capturing section which receives light from a photographic subject and generates an image signal;
   an accumulation section which accumulates images captured by the image-capturing section;
   a first transfer register which is provided in the accumulation section and stores a first image captured by the image-capturing section;
   a second transfer register which is provided in the accumulation section, is disposed to intersect with the first transfer register, and stores a second image captured at a different time from a time the first image was captured by the image-capturing section;
   a blurring detection section which detects relative blurring between the first image and the second image;
   a transfer control section which performs control so that the first transfer register and the second transfer register respectively transfer the first image and the second image so as to correct the relative blurring between the first image and the second image in accordance with blurring of an image which is detected by the blurring detection section;
   an image combining section which generates a composite image by combining the first image and the second image which are transferred on the basis of the control performed by the transfer control section.

* * * * *